United States Patent
Ollila

(10) Patent No.: US 12,530,739 B2
(45) Date of Patent: Jan. 20, 2026

(54) INTERPOLATING AND DEMOSAICKING SUBSAMPLED PIXELS USING NEURAL NETWORKS

(71) Applicant: Varjo Technologies Oy, Helsinki (FI)

(72) Inventor: Mikko Ollila, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 412 days.

(21) Appl. No.: 18/357,528

(22) Filed: Jul. 24, 2023

(65) Prior Publication Data

US 2025/0037235 A1 Jan. 30, 2025

(51) Int. Cl.
*G06T 3/4046* (2024.01)
*G06F 3/01* (2006.01)
*G06T 3/4015* (2024.01)

(52) U.S. Cl.
CPC ............ *G06T 3/4046* (2013.01); *G06F 3/013* (2013.01); *G06T 3/4015* (2013.01)

(58) Field of Classification Search
CPC ...... G06T 3/4046; G06T 3/4015; G06F 3/013
USPC .......................................................... 382/298
See application file for complete search history.

(56) References Cited

U.S. PATENT DOCUMENTS

| | | | | |
|---|---|---|---|---|
| 9,990,695 | B2 * | 6/2018 | Nishimura | G06T 11/001 |
| 2021/0241429 | A1 * | 8/2021 | Pan | G06T 5/20 |
| 2023/0375462 | A1 * | 11/2023 | Giryes | G02B 27/288 |
| 2024/0320787 | A1 * | 9/2024 | Shen | G06T 3/4015 |

* cited by examiner

*Primary Examiner* — Gabriel I Garcia
(74) *Attorney, Agent, or Firm* — Ziegler IP Law Group, LLC.

(57) ABSTRACT

Disclosed is imaging system having an image sensor with pixels arranged on photo-sensitive surface. The image sensor is employed to read out RAW image data, wherein at least a portion of RAW image data is subsampled during read out from at least a portion of photo-sensitive surface. Processor(s) are configured to obtain RAW image data read out by image sensor; and perform interpolation and demosaicking on the portion of RAW image data using neural network(s), to generate first intermediate image data, wherein an input of neural network(s) is the portion of RAW image data and subsampling mask(s), wherein subsampling mask(s) indicates pixels that have not been read out.

16 Claims, 5 Drawing Sheets

INTERPOLATING AND DEMOSAICKING SUBSAMPLED PIXELS USING NEURAL NETWORKS

TECHNICAL FIELD

The present disclosure relates to imaging systems for interpolating and demosaicking subsampled pixels using neural networks. The present disclosure relates to methods for interpolating and demosaicking subsampled pixels using neural networks.

BACKGROUND

Nowadays, with an increase in the number of images being captured every day, there is an increased demand for developments in image processing. Such a demand is quite high and critical in case of evolving technologies such as immersive extended-reality (XR) technologies which are being employed in various fields such as entertainment, real estate, training, medical imaging operations, simulators, navigation, and the like. Several advancements are being made to develop image processing technology.

However, existing image processing technology has several limitations associated therewith. Firstly, the existing image processing technology processes image signals captured by pixels of an image sensor of a camera in a manner that such processing requires considerable processing resources, involves a long processing time, requires high computing power, and limits a total number of pixels that can be arranged on an image sensor for full pixel readout at a given frame rate. As an example, image signals corresponding to only about 9 million pixels on the image sensor may be processed currently (by full pixel readout) to generate image frames at 90 frames per second (FPS). This is far less than about 50 million pixels required to be read at 90 FPS at a resolution of 60 pixels per degree (namely, to achieve human eye resolution). Secondly, the existing image processing technology is unable to cope with visual quality requirements, for example, such as a high resolution (such as a resolution higher than or equal to 60 pixels per degree), a small pixel size, a large field of view (FOV), and a high frame rate (such as a frame rate higher than or equal to 90 FPS) in some display devices (such as XR devices). In an example, some XR devices may employ two or more cameras per eye to obtain images having a large FOV at a high frame rate. However, in such images, a high resolution is obtained only in a narrow region, since focal lengths of optical elements of the two or more cameras are typically modified by distortion in order to obtain the large field of view. Resultantly, the generated images lack requisite visual quality, thereby leading to a poor, non-immersive viewing experience for the user. Moreover, some existing image processing technologies rely on reducing an output data rate from the image sensor to a server for further processing. This may be done to overcome limitations in a camera bus or in encoding capacity, or to reduce bandwidth requirements for data transmission. One way to reduce the output data rate is to rescale an output resolution of an image generated at the server; but, this reduces an overall resolution of the image adversely.

Therefore, in light of the foregoing discussion, there exists a need to overcome the aforementioned drawbacks.

SUMMARY

The present disclosure seeks to provide an imaging system and a method for generating image frames of acceptably high image quality, in a manner that a high frame rate is obtained, and at least one processor is not excessively computationally overburdened. The aim of the present disclosure is achieved by an imaging system and a method which incorporate interpolation and demosaicking of subsampled pixels using neural networks, as defined in the appended independent claims to which reference is made to. Advantageous features are set out in the appended dependent claims.

Embodiments of the present disclosure substantially eliminate or at least partially address the aforementioned problems in the prior art, and enable accurate, reliable interpolation and demosaicking of subsampled pixels using the at least one neural network to generate image frames of acceptably high image quality, in a manner that a high frame rate is obtained, and the at least one processor is not excessively computationally overburdened.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 2A illustrates different portions on a photo-sensitive surface of an image sensor, while

FIGS. 6A and 6B illustrate exemplary ways in which a subsampling mask indicates colours of pixels using spatial pixel codes, in accordance with an embodiment of the present disclosure;

FIG. 7A illustrates an exemplary colour filter array (CFA) pattern of an image sensor indicated by a subsampling mask, while FIG. 7B illustrates an exemplary way in which a portion of the subsampling mask indicates colours in a smallest repeating 4×4 array in the image sensor using different spatial pixel codes, in accordance with an embodiment of the present disclosure; and FIG. 8 illustrate steps of a method for interpolating and demosaicking subsampled pixels using neural networks, in accordance with an embodiment of the present disclosure.

DETAILED DESCRIPTION OF EMBODIMENTS

Figure 1:
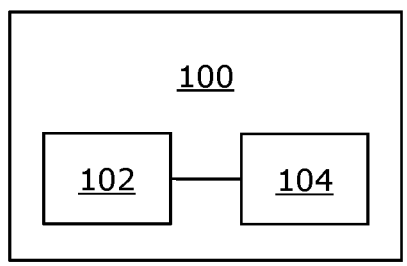
FIG. 1 illustrates a block diagram of an architecture of an imaging system for interpolating and demosaicking subsampled pixels using neural networks, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:
   an image sensor comprising a plurality of pixels arranged on a photo-sensitive surface thereof, the image sensor being employed to read out RAW image data, wherein at least a portion of the RAW image data is subsampled during read out from at least a portion of the photo-sensitive surface; and
   at least one processor configured to:
      obtain the RAW image data read out by the image sensor; and
      perform interpolation and demosaicking on at least said portion of the RAW image data using at least one neural network, to generate a first intermediate image data, wherein an input of the at least one neural network comprises said portion of the RAW image data and at least one subsampling mask, wherein the at least one subsampling mask indicates pixels that have not been read out.

In a second aspect, an embodiment of the present disclosure provides a method comprising:
   obtaining RAW image data read out by an image sensor, wherein the image sensor comprises a plurality of pixels arranged on a photo-sensitive surface thereof, and wherein at least a portion of the RAW image data is subsampled during the read out from at least a portion of the photo-sensitive surface; and
   performing interpolation and demosaicking on at least said portion of the RAW image data using at least one neural network, for generating a first intermediate image data, wherein an input of the at least one neural network comprises said portion of the RAW image data and at least one subsampling mask, wherein the at least one subsampling mask indicates pixels that have not been read out.

The present disclosure provides the aforementioned imaging system and method for interpolating and demosaicking subsampled pixels using neural networks. Herein, at least the portion of the RAW image data is subsampled (i.e., selectively read out) from at least the portion of the photo-sensitive surface, and then the interpolation and the demosaicking are performed on said portion of the RAW image data using the at least one neural network in a highly accurate, yet efficient manner as compared to conventional techniques, based on the at least one subsampling mask. Upon the interpolation and the demosaicking, the first intermediate image data comprising colour information of all pixels of the portion of the photo-sensitive surface, could then be processed to generate a given image frame of a high image quality. Performing the interpolation and the demosaicking using the at least one neural network facilitates in reducing computational burden on the at least one processor, delays, and excessive power consumption. Furthermore, the at least one processor can be judiciously used to also perform other processing tasks, if and when required. A selective read out from at least the portion of the photo-sensitive surface also facilitates in providing a high frame rate of image frames. This facilitates an increase in overall efficiency of the at least one processor, and makes the imaging system suitable for use with demanding applications (such as extended-reality applications). Moreover, the imaging system can easily employ a single camera per eye to obtain an acceptably high image quality in image frames, whilst providing the image frames at a high frame rate. The method and the imaging system are simple, robust, fast, reliable, and can be implemented with ease.

Throughout the present disclosure, the term "image sensor" refers to a device that detects light from a real-world environment at its photo-sensitive surface, thereby enabling the plurality of pixels arranged on the photo-sensitive surface to capture a plurality of image signals. The plurality of image signals are electrical signals pertaining to a real-world scene of the real-world environment. The plurality of image signals constitute the RAW image data of the plurality of pixels. Examples of the image sensor include, but are not limited to, a charge-coupled device (CCD) image sensor, and a complementary metal-oxide-semiconductor (CMOS) image sensor. It will be appreciated that the plurality of pixels could, for example, be arranged in a rectangular two-dimensional (2D) grid, a polygonal arrangement, a circular arrangement, an elliptical arrangement, a freeform arrangement, or the like, on the photo-sensitive surface. In an example, the image sensor may comprise 25 megapixels arranged in the rectangular 2D grid (such as a 5000×5000 grid) on the photo-sensitive surface.

It will be appreciated that the image sensor is a part of at least one camera. The at least one processor of the imaging system may also be a part of the at least one camera. The at least one camera could, for example, be arranged anywhere in the real-world environment where a user is present, or could be arranged on a teleport device present in the real-world environment, or could be arranged on a client device worn by the user on his/her head. The term "teleport device" refers to a specialized equipment that is capable of facilitating virtual teleportation. The term "client device" refers to a specialized equipment that is capable of at least displaying a given image frame. Optionally, the imaging system is communicably coupled with the client device wirelessly and/or in a wired manner. Optionally, the client device is implemented as a head-mounted display (HMD) device. The term "head-mounted display" device refers to specialized equipment that is configured to present an XR environment to the user when said HMD, in operation, is worn by the user on his/her head. The HMD is implemented, for example, as an XR headset, a pair of XR glasses, and the like, that is operable to display a visual scene of the XR environment to the user. The term "extended-reality" encompasses virtual reality (VR), augmented reality (AR), mixed reality (MR), and the like.

Optionally, the at least one camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Optionally, the image sensor comprises a Bayer colour filter array (CFA) arranged in front of the plurality of pixels. Such a Bayer CFA could be one of: a 4C Bayer CFA (also referred to as "quad" or "tetra", wherein a group of 2×2 pixels has a same colour), a 9C Bayer CFA (also referred to as "nona", wherein a group of 3×3 pixels has a same colour), a 16C Bayer CFA (also referred to as "hexadeca", wherein a group of 4×4 pixels has a same colour). As another example, the RGB-IR camera can be a 2×2 pattern-based RGB-IR camera, a 4×4 pattern-based RGB-IR camera, or similar. Alternatively, optionally, the image sensor comprises a multispectral filter arranged in front of the plurality of pixels. The term "multispectral filter" refers to a type of filter that is capable of selectively transmitting or blocking certain wavelengths of the light incident upon the image sensor, thereby allowing only specific wavelengths of the light to pass therethrough. The multispectral filter is capable of filtering the light in a wider range of colours (for example, in 16 different colours or even more), as compared to traditional 3-5 colour filters used in any of the aforementioned visible-light cameras. The multispectral filters are well-known in the art. Additionally, optionally, the at least one camera is implemented as a depth camera. Examples of the depth camera include, but are limited to, a Time-of-Flight (ToF) camera, a light detection and ranging (LiDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. The at least one camera is optionally implemented as a combination of the visible-light camera and the depth camera.

As an example, the at least one camera may be implemented as the stereo camera. As another example, the at least one camera may have an image sensor having 576 million pixels, wherein 2×2 grids, 3×3 grids or even 4×4 grids of pixels of a same colour can be binned to form a single super pixel. Such an implementation of the image sensor provides a native pixel resolution. The image sensor may, for example, have several QUAD/4C colour pixels in grids, wherein QUAD/4C colour pixels in each grid are to be binned to form a corresponding super pixel. Each grid of QUAD/4C colour pixels has four pixels of a same colour being arranged next to each other in a 2×2 manner, wherein these four pixels are binned to form a single super pixel of the same colour.

Notably, the at least one processor controls overall operation of the imaging system. The at least one processor is communicably coupled to at least the image sensor. Optionally, the at least one processor is implemented as an image signal processor. In an example, the image signal processor may be a programmable digital signal processor (DSP). Alternatively, optionally, the at least one processor is implemented as a cloud server that provides a cloud computing service.

Notably, the RAW image data is read out by the image sensor. In particular, the image sensor reads out only some pixels from at least said portion of the photo-sensitive surface, instead of reading out each pixel from at least said portion of the photo-sensitive surface. Thus, when selectively reading out said portion of the RAW image data, image signals captured by only some pixels of said portion of the photo-sensitive surface are processed. Optionally, when the plurality of pixels are arranged in the rectangular 2D grid on the photo-sensitive surface, the image sensor is configured to read out the RAW image data in a line-by-line manner. In some implementations, an entire image frame is subsampled. In other implementations, only a portion of an entire image frame is subsampled.

It will be appreciated that such a selective read out of said portion of the RAW image data facilitates in providing a high frame rate of image frames. The frame rate is expressed in terms of frames per second (FPS), and may, for example, be 60 FPS, 90 FPS, 120 FPS, or higher. This is because a processing time for selectively reading out said portion of the RAW image data and generating RAW image data of remaining unread pixels of said portion of the photo-sensitive surface using the RAW image data of read pixels, is considerably lesser as compared to a processing time for reading out RAW image data from each pixel of said portion of the photo-sensitive surface. Therefore, in a given time duration, a higher number of image frames could be generated and displayed when said portion of the RAW image data is selectively read out, as compared to when RAW image data from all pixels in said portion of the photo-sensitive surface is to be read out. It will also be appreciated that subsampling of the RAW image data could either be performed during reading out from the image sensor, or be performed prior to conversion of the RAW image data into a given colour space format (for example, such as an RGB format, a Luminance and two-colour differences (YUV) format, or the like) in the ISP pipeline. Both of the aforesaid ways of subsampling are well-known in the art.

Throughout the present disclosure, the term "image data" refers to information pertaining to a given pixel of a given portion of the photo-sensitive surface, wherein said information comprises one or more of: a colour value of the given pixel, a depth value of the given pixel, a transparency value of the given pixel, a luminance value of the given pixel. The term "RAW image data" refers to an image data that is unprocessed or minimally processed when obtained from the image sensor. The RAW form of image data is well-known in the art.

Notably, RAW image data of the remaining unread pixels of said portion of the photo-sensitive surface is generated using the RAW image data of the read pixels of said portion of the photo-sensitive surface. Optionally, in this regard, the at least one processor is configured to perform the interpolation on the RAW image data of the read pixels using the at least one neural network, to generate the RAW image data of the remaining unread pixels. The "interpolation" is a specialized process of reconstructing unread RAW image data of some pixels of the photo-sensitive surface by using RAW image data read out from other pixels of the photo-sensitive surface. The interpolation is required because the RAW image data is subsampled from said portion of the photo-sensitive surface. The interpolation is well-known in the art.

Optionally, the at least one processor performs the interpolation by employing at least one interpolation filtering algorithm. Optionally, the at least one interpolation filtering algorithm is at least one of: a bilinear interpolation algorithm, an edge-directed weighted-sum interpolation algorithm, a weighted sum interpolation algorithm, a local colour ratio (LCR) algorithm, a median-based interpolation algorithm, an average-based interpolation algorithm, a linear interpolation filtering algorithm, a cubic interpolation filtering algorithm, a four-nearest-neighbours interpolation filtering algorithm, a natural-neighbour interpolation filtering algorithm, a steering kernel regression interpolation filtering algorithm. The aforesaid algorithms are well-known in the art.

Upon performing the interpolation, the demosaicking is performed for generating the first intermediate image data comprising a set of complete colour values (for example, such as RGB colour values or similar) for each pixel of said portion of the photo-sensitive surface. Such a set of complete colour values is subsequently utilised for generating a given image frame. In some implementations, the interpolation is performed on at least said portion of the RAW image data prior to the demosaicking. In other implementations, the demosaicking and the interpolation are combined as a single operation, for example, when at least one neural network is to be employed (by the at least one processor) for performing the demosaicking and the interpolation (as discussed hereinbelow). Some aforesaid interpolation filtering algorithms could also be used for performing the demosaicking. The at least one neural network performs the interpolation and the demosaicking in a highly accurate manner, as compared to conventional techniques. It will be appreciated that the input (comprising said portion of the RAW image data and the at least one subsampling mask) is provided to the at least one neural network both in a training phase of the at least one neural network and in an inference phase of the at least one neural network (i.e., when the at least one neural is utilised after it has been trained). It will also be appreciated that when the at least one neural network is used, the demosaicking and the interpolation could be combined as a single operation, unlike in the conventional techniques where the demosaicking and the interpolation are treated as separate operations and where information pertaining to linear or non-linear relationships between neighbouring pixels is necessary for performing these operations. The interpolation performed using the at least one neural network can be understood to be inpainting or hallucinating missing image data. In addition to these operations, there could be various image enhancement or image restoration operations (as mentioned hereinbelow) that can be performed additionally and optionally, using the at least one neural network. In this way, the at least one neural network may be trained to generate acceptably accurate missing image data based on available image data. These operations can even be performed at different scales or levels of detail to enhance an overall visual quality of a given image frame. Additionally, optionally, a training process of the at least one neural network involves utilising a loss function that is generated based on perceptual factors and contextual factors. Such a loss function would be different from a loss function utilised in the conventional techniques. Perceptual loss factors may relate to visual perception of the generated given image frame. Instead of solely considering pixel-level differences, perceptual loss factors aim to measure a similarity in terms of higher-level visual features of an image frame. Contextual loss factors may take into account a relationship and a coherence between neighbouring pixels in the image frame. By incorporating the perceptual factors and the contextual factors into the training process, the at least one neural network can produce a visually-pleasing and contextually-coherent result. It will be appreciated that the loss function of the at least one neural network could optionally also take into account various image enhancement/restoration operations beyond just the demosaicking and the interpolation; the various image enhancement/restoration operations may, for example, include at least one of: deblurring, contrast enhancement, low-light enhancement, tone mapping, colour conversion, super-resolution, white balancing, super-resolution, compression.

When evaluating a performance of the at least one neural network and its associated loss function, it can be beneficial to compare the generated image frame and a ground-truth image frame at different scales/resolutions. This can be done to assess an image quality and a visual fidelity of the generated image frame across various levels of detail/resolutions. For instance, the aforesaid comparison can be made at a highest resolution, which represents an original resolution of the image frame. This allows for a detailed evaluation of pixel-level accuracy of the generated image frame. Alternatively or additionally, the aforesaid comparison can be made at a reduced resolutions, for example, such as ¼th of the original resolution. This provides an assessment of an overall perceptual quality and ability of the at least one network to capture and reproduce important visual features at coarser levels of detail also. Thus, by evaluating the loss function at different scales, more comprehensive understanding of the performance of the at least one neural network can be known. The loss function, the perceptual factors, and the contextual factors are well-known in the art.

Throughout the present disclosure, the term "subsampling mask" refers to a software-based masking pattern that enables in selectively reading out pixels from at least said portion of the photo-sensitive surface. In this regard, pixels whose locations are indicated in the at least one subsampling mask as skipped are not read out from at least the portion the photo-sensitive surface, while pixels whose locations are indicated in the at least one subsampling mask as not skipped are read out from at least the portion the photo-sensitive surface. The at least one subsampling mask may be utilised to provide a predetermined selection criterion for subsampling pixels during the read out from at least the portion of the photo-sensitive surface. Optionally, the at least one subsampling mask is a bit mask, wherein '0' indicates a pixel to be skipped and '1' indicates a pixel to be read out. It will be appreciated that the at least one subsampling mask could be a single mask or multiple masks (for example, such as one subsampling mask indicating a colour filter array (CFA) pattern of the image sensor, another subsampling mask indicating unread pixels and, optionally, read-out pixels).

It will be appreciated that the at least one subsampling mask could be a non-regular pattern, wherein the non-regular pattern is a software-based masking pattern which indicates locations of irregularly-arranged (i.e., disorderly arranged) pixels in at least the portion of the photo-sensitive surface that are to be read out. Such pixels are not selected according to any typical or standardised spatially-regular manner, but in fact are deliberately and carefully selected in a spatially-irregular manner so as to facilitate in accurately and reliably generating image data corresponding to remaining pixels in at least the portion of the photo-sensitive surface. It will also be appreciated that the at least one subsampling mask could alternatively be a random pattern, a gradient-type pattern, or a regular pattern.

In an embodiment, the at least one processor is configured to:

perform demosaicking on a remaining portion of the RAW image data that is not subsampled during the read out, to generate a second intermediate image data; and process the first intermediate image data and the second intermediate image data to generate a full image frame.

In this regard, the at least one processor reads out the remaining portion of the RAW image data from a remaining portion of the photo-sensitive surface. This could be particularly beneficial when the remaining portion of the photo-sensitive surface corresponds to a gaze position on the photo-sensitive surface according to a gaze direction of a user's eye. The gaze position will be discussed later in detail. When reading out the remaining portion of the RAW image data, image signals captured by each pixel of the remaining portion of the photo-sensitive surface are processed. As a result, the remaining portion of the RAW image data enables in achieving a high visual quality (i.e., a native resolution) in corresponding gaze-contingent pixels of the full image frame. Since the RAW image data is sampled from the remaining portion of the photo-sensitive surface, the interpolation is not required to be performed, and thus only the demosaicking is performed by the at least one processor without using the at least one neural network. The demosaicking is performed for generating the second intermediate image data comprising a set of complete colour values (for example, such as RGB colour values) for each pixel of the remaining portion of the photo-sensitive surface. Such a set of complete colour values of pixels is subsequently utilised for generating the full image frame.

Throughout the present disclosure, the term "image frame" refers to a visual representation of a real-world environment. The term "visual representation" encompasses colour information represented in the image frame, and additionally optionally other attributes associated with the image frame (for example, such as depth information, luminance information, transparency information (namely, alpha values), polarisation information, and the like).

Optionally, when processing the first intermediate image data and the second intermediate image data to generate the full image frame, the at least one processor is configured to employ at least image processing algorithm. Examples of the at least one image processing algorithm include, but are not limited to, an image denoising algorithm, an image sharpening algorithm, a colour conversion algorithm, an auto white balancing algorithm, a deblurring algorithm, a contrast enhancement algorithm, a low-light enhancement algorithm, a tone mapping algorithm, a super-resolution algorithm, and an image compression algorithm. Such image processing techniques are well-known in the art. Different image data corresponding to different parts of the full image frame are processed by the at least one processor in a manner that processor overburdening, delays, and excessive power consumption do not occur during said processing. An image quality of the full image frame so generated emulates image viewing quality and characteristics of human visual system. In particular, the full image frame has spatially variable resolution, wherein a first region of the full image frame corresponding to the remaining portion of the photo-sensitive surface has a first resolution that is higher than a second resolution of a second region of the full image frame corresponding to said portion of the photo-sensitive surface. It will be appreciated that the at least one processor may further process the first intermediate image data using the at least one neural network, for example, by applying at least one of: sharpening, noise reduction, inpainting.

In an alternative or additional embodiment, for each $N^{th}$ image frame, the remaining portion of the RAW image data is also subsampled during read out from the remaining portion of the photo-sensitive surface, wherein the at least one processor is configured to:
  perform interpolation and demosaicking on the remaining portion of the RAW image data using the at least one neural network, to generate a second intermediate image data, wherein the input of the at least one neural network further comprises the remaining portion of the RAW image data; and
  process the first intermediate image data and the second intermediate image data to generate a full image frame.

In this regard, for each $N^{th}$ image frame, the image sensor selectively reads out the remaining portion of the RAW image data from the remaining portion of the photo-sensitive surface. Thus, when selectively reading out the remaining portion of the RAW image data, image signals captured by only some pixels of the remaining portion of the photo-sensitive surface are processed. Such a selective read out of the remaining portion of the RAW image data facilitates in providing a high frame rate of image frames with acceptably high image quality of image frames, as discussed earlier. Optionally, the at least one processor is configured to perform the interpolation on the remaining portion of the RAW image data using the at least one neural network, to generate RAW image data of unread pixels in the remaining portion of the photo-sensitive surface. The interpolation and the demosaicking are performed in a similar manner as described earlier. Moreover, processing the aforesaid intermediate image data to generate the full image frame could be performed in a same manner as described earlier.

Optionally, a subsampling density of the remaining portion of the RAW image data is higher than a subsampling density of said portion of the RAW image data. The term "subsampling density" refers to a number of pixels that are to be read out (namely, sampled) from at least the portion of the photosensitive surface per unit area. In this regard, said area may be expressed in terms of a total number of pixels, a number of pixels in both horizontal and vertical dimensions, units of length, or similar. For example, the subsampling density may be 2 pixels per 10 pixels, 4 pixels per 4×4 grid of pixels, 5 pixels per 50 square micrometres of the image sensor, or similar. Greater the subsampling density, greater is the number of pixels that would be read out from at least the portion of the photosensitive surface per unit area, and vice versa.

When the subsampling density of the remaining portion of the RAW image data is optionally higher than the subsampling density of said portion of the RAW image data, it means that an amount of RAW image data that is read out from the remaining portion of the photo-sensitive surface per unit area is greater, as compared to an amount of RAW image data that is read out from said portion of the photo-sensitive surface per unit area. This would occur when a number of pixels that are to be read from the remaining portion of the photo-sensitive surface per unit area are greater, as compared to a number of pixels that are to be read from said portion of the photo-sensitive surface per unit area. Such an implementation would be particularly beneficial when the remaining portion of the RAW image data is gaze-contingent RAW image data. This means that when the remaining portion of the photo-sensitive surface includes and surrounds the gaze position on the photo-sensitive surface, a higher subsampling density of the remaining portion of the RAW image data would be required for accurately and reliably generating RAW image data corresponding to unread pixels lying near the gaze position, using RAW image data corresponding to read out pixels in the remaining portion. This is because when the remaining portion of the photo-sensitive surface includes and surrounds the gaze position, pixels in the remaining portion would be perceived in a given image frame with high visual acuity by a fovea of the user's eye, as compared to pixels in said portion of the photo-sensitive surface. The image quality of the full image frame so generated emulates image viewing quality and characteristics of human visual system. In particular, the full image frame has the spatially variable resolution, as explained earlier. The gaze position will be discussed later in detail.

In an example, for a given image frame, 6 pixels per 3×3 grid of pixels may be read out from the remaining portion of the photo-sensitive surface, whereas only 3 pixels per 3×3 grid of pixels may be read out from the said portion of the photo-sensitive surface. In such a case, the subsampling density of the remaining portion of the RAW image data is higher than the subsampling density of said portion of the RAW image data.

Optionally, the at least one processor is configured to perform the interpolation and the demosaicking on the remaining portion of the RAW image data using at least one other neural network. In this regard, the at least one other neural network (that is different from the at least one neural network used for the aforesaid portion of the RAW image data) is exclusively utilised for performing the interpolation and the demosaicking on the remaining portion. This may be particularly beneficial when the remaining portion of the RAW image data is the gaze-contingent RAW image data, and thus employing a separate/dedicated neural network for its processing could potentially facilitate in generating the full image frame in real time or near-real time. It is to be understood that the at least one other neural network performs the interpolation and the demosaicking in a similar manner as the at least one neural network, albeit to generate the second intermediate image data with a higher resolution as compared to the first intermediate image data. Optionally, an input to the at least one other neural network comprises the remaining portion of the RAW image data and the at least one subsampling mask. Such an input could be provided to the at least one other neural network both in a training phase and an inference phase of the at least one other neural network.

Optionally, the at least one processor is configured to:
change the at least one subsampling mask from one image frame to another image frame; and
control the image sensor to read out the RAW image data according to the at least one subsampling mask.

In this regard, when the at least one subsampling mask is same for each image frame, a user viewing a sequence of image frames may be able to perceive a same pattern of varying visual quality in the sequence of image frames, said pattern having a high-quality region (corresponding to the sampled pixels which are read out according to the at least one subsampling mask) and a low-quality region (corresponding to skipped pixels according to the at least one subsampling mask). Therefore, the at least one processor changes the at least one subsampling mask from one image frame to another image frame, such that visual quality in the sequence of image frames would vary differently, and such variation would be imperceptible (i.e., unnoticeable) to the user. Moreover, when the at least one subsampling mask is changed from one image frame to another image frame, undesirable visual artifacts (such as moiré effect) due to aliasing are considerably reduced in the sequence of image frames.

Optionally, when changing the at least one subsampling mask from one image frame to another image frame, the at least one processor is configured to employ, for a given image frame, a given subsampling mask that is selected from amongst a plurality of subsampling masks. Optionally, the number of subsampling masks in the plurality of subsampling masks lies in a range of 2 to 32. As an example, the number of the plurality of subsampling masks may be from 2, 4, 9, 12, 16 or 25 up to 10, 16, 20, 25 or 32. In this regard, when a number of image frames exceeds the number of the plurality of subsampling masks, the at least one processor may employ one subsampling mask for one image frame until all subsampling masks in the plurality of subsampling masks are employed once, and then re-employ the (same) plurality of subsampling masks for subsequent image frames in a cyclic manner. In an example, the at least one processor may employ eight subsampling masks M1, M2, M3, M4, M5, M6, M7, and M8 for 16 image frames F1, F2, F3, F4, F5, F6, F7, F8, F9, F10, F11, F12, F13, F14, F15, F16. Herein, the at least one processor may employ the subsampling masks in a sequence: M1, M2, M3, M4, M5, M6, M7, M8, M1, M2, M3, M4, M5, M6, M7, M8 for the image frames F1, F2, F3, F4, F5, F6, F7, F8, F9, F10, F11, F12, F13, F14, F15, F16, respectively.

It will be appreciated that a change in the at least one subsampling mask from one image frame to another image frame can be at a granularity of a single pixel (i.e., the at least one subsampling mask has a minor change from one image frame to another image frame where only one pixel is changed), or at a granularity of several pixels (i.e., the at least one subsampling mask has a drastic change from one image frame to another image frame where a large number of pixels are changed).

Optionally, the at least one subsampling mask is selected randomly. In this regard, when the plurality of subsampling masks are to be employed for the sequence of image frames, the at least one processor selects a given subsampling mask from amongst the plurality of subsampling masks in a random manner (namely, arbitrarily) for a given image frame in the sequence of image frames. The technical benefit of such a random selection is that the user viewing the sequence of image frames would not be able to perceive (namely, notice) a same repeated pattern of varying visual quality in the sequence of image frames, which otherwise would have been perceived by the user when the plurality of subsampling masks are selected in a specific manner for the sequence of image frames. It will be appreciated that when the number of image frames exceeds the number of the plurality of subsampling masks, the at least one processor may select a given subsampling mask for a given image frame randomly until all subsampling masks in the plurality of subsampling masks are employed once, and then re-employ the (same) plurality of subsampling masks for subsequent image frames randomly. Referring to the previous example, the at least one processor may employ the subsampling masks in a sequence: M2, M1, M7, M3, M5, M4, M6, M8, M1, M5, M6, M2, M7, M1, M3, M2 for the image frames F1, F2, F3, F4, F5, F6, F7, F8, F9, F10, F11, F12, F13, F14, F15, F16, respectively.

Moreover, optionally, the at least one subsampling mask further indicates a colour filter array (CFA) pattern of the image sensor. The term "colour filter array" refers to an arrangement of colour filters in front of the plurality of pixels of the image sensor in a manner that each pixel of the image sensor is covered by a colour filter (for example, a red colour filter, a green colour filter, a blue colour filter, or similar) that allows only a certain wavelength of light (corresponding to a colour of the colour filter) to pass therethrough and be detected by the image sensor. Examples of the CFA pattern include, but are not limited to, a Bayer CFA pattern, an X-Trans CFA pattern, a Tetracell CFA pattern, and a Nonacell CFA pattern. The aforesaid CFA patterns are well-known in the art. In case of the Bayer CFA pattern, when the plurality of pixels of the image sensor are arranged in a rectangular 2D grid, the Bayer CFA pattern may have an alternate arrangement of red colour filters and green colour filters for odd rows of the rectangular 2D grid, and an alternate arrangement of green colour filters and blue colour filters for even rows of the rectangular 2D grid.

It will be appreciated that the CFA pattern represents locations of different colour pixels (for example, green colour pixels, red colour pixels, and blue colour pixels that correspond to green colour filters, red colour filters, and blue colour filters of the CFA pattern, respectively) that can be read out from the image sensor. Since said portion of the RAW image data is subsampled during the read out, the CFA pattern is required to be known to the at least one neural network while performing the interpolation on said portion of the RAW image data, in order to generate unread RAW image data corresponding to some pixels of the image sensor by using RAW image data read out from other pixels of the image sensor.

It will also be appreciated that the at least one subsampling mask may be implemented as a single subsampling mask indicating an entirety of the CFA pattern, or be implemented as different subsampling masks indicating different colour filters of the CFA pattern separately. Moreover, information pertaining to the CFA pattern may be coded into a mosaic guidance matrix, wherein the different colour filters of the CFA pattern are represented using different indexing values in the mosaic guidance matrix. In an example, for a 2×2 grid of RGGB pixels, indexing values 0, 1, and 2 may be used to represent a red colour filter, a green colour filter, and a blue colour filter, respectively, of the CFA pattern. In another example, for a 2×2 grid of RGGB pixels, indexing values 0, 1, 2, and 3 may be used to represent a red colour filter, a first green colour filter, a second green colour filter, and a blue colour filter, respectively, of the CFA pattern. One such way of indicating the CFA pattern is described, for example, in "*Demo-Net: A Low Complexity Convolutional Neural Network for Demosaicking Images*" by Mert Bektas et al., published in IEEE International Conference on Consumer Electronics, pp. 1-2, 2022, which has been incorporated herein by reference.

Additionally or alternatively, optionally, the at least one subsampling mask further indicates at least one of:
colours of pixels that have been read out,
colours of pixels that have not been read out,
different colours using different spatial pixel codes,
repetitions of a same colour in a smallest repeating M×N array in the image sensor using different spatial pixel codes,
different combinations of neighbouring pixels having a same colour in the smallest repeating M×N array using different spatial pixel codes,
pixels per degree of the RAW image data.

In this regard, by indicating the colours of pixels that have been read out and that have not been read out in the at least one subsampling mask, the at least one neural network would accurately know for which pixels RAW image data is available, and for which pixels RAW image data is unread. Then, the unread RAW image data can be easily and accurately generated by the at least one neural network using available RAW image data that has been read out. Furthermore, using the different spatial pixel codes for indicating the colours of pixels that have been read out and that have not been read out is relatively easier and convenient to implement. Advantageously, this may also facilitate in training the at least one neural network in a time-efficient manner, and potentially reducing processing time and utilization of processing resources of the at least one processor for generating a given intermediate image data.

A given spatial pixel code represents a colour and optionally, a spatial position of a given pixel in a smallest repeating M×N array. Pixels having same colours may or may not have a same spatial pixel code. The given spatial pixel code could, for example, be a numeric code, an alphabetic code, an alphanumeric code, and the like. In an example, a given portion of the at least one subsampling mask may correspond to a 4×4 array of pixels, and the given portion may be repeated in an entirety of the at least one subsampling mask. The given portion of the at least one subsampling mask may indicate 4 pixels (for example, such as two green colour pixels, one blue colour pixel, and one red colour pixel) that have been read out from amongst 16 pixels, and may also indicate colours of such 4 pixels, using different spatial pixel codes, for example, such as '0' indicating a green colour pixel, '1' indicating a blue colour pixel, and '2' indicating a red colour pixel. Additionally, said portion of the subsampling mask may also indicate 12 pixels that have not been read out (namely, 12 pixels that are skipped) from amongst the 16 pixels, using a single spatial pixel code, for example, such as '3', '4', '−1', or similar. Such a single spatial pixel code only indicates that these 12 pixels have not been read out. One such example has been also illustrated in conjunction with FIG. 6A, for sake of better understanding.

Alternatively, in the previous example, the given portion of the at least one subsampling mask may indicate colours of the 4 pixels, using different spatial pixel codes, for example, such as '0' indicating a first green colour pixel, '1' indicating a blue colour pixel, '2' indicating a red colour pixel, and '3' indicating a second green colour pixel. Additionally, said portion may also indicate colours of the 12 pixels that have not been read out, using different spatial pixel codes, for example, such as '4' indicating an unread first green colour pixel, '5' indicating an unread red colour pixel, '6' indicating an unread blue colour pixel, and '7' indicating an unread second green colour pixel. Such an example has been also illustrated in conjunction with FIG. 6B, for sake of better understanding.

Additionally, optionally, when the same colour is repeated in the smallest repeating M×N array, different spatial pixel codes could be used for indicating different neighbouring pixels having the same colour in the smallest repeating M×N array. The term "smallest repeating M×N array" refers to a smallest array of pixels that is repeated in the image sensor. The M×N array could, for example, be a 2×2 array, a 3×3 array, a 4×4 array, or similar. In an example, a portion of the subsampling mask may indicate colours in a smallest repeating 4×4 array in the image sensor such that 4 blue colour pixels are indicated using 4 different spatial pixel codes '1', '2', '3', and '4', respectively, 8 green colour pixels are indicated using 8 different spatial pixel codes '5', '6', '7', '8', '9', '10', '11', and '12', respectively, and 4 red colour pixels are indicated using 4 different spatial pixel codes as '13', '14', '15' and '16', respectively. Such an example has been also illustrated in conjunction with FIG. 7B, for sake of better understanding.

Additionally, optionally, two or more neighbouring pixels having the same colour in the smallest repeating M×N array are combined together to be read out as a single pixel, and thus are indicated in the at least one subsampling mask using a different spatial pixel code. As a result, these different spatial pixel codes indicate how a combination of certain neighbouring pixels have been read out together. Such a combination could, for example, be a horizontal combination, a vertical combination, and/or a diagonal combination. It will be appreciated that the repetitions of the same colour or the two or more neighbouring pixels having the same colour could be combined together (for example, such as using a binning technique), and thus could be indicated in the at least one subsampling mask using a different spatial pixel code. Said combination may occur in an analog domain (wherein, analog electrical signals of the two or more neighbouring pixels are combined prior to their conversion to digital colour values), or in a charge domain (wherein, electrical charge signals of the two or more neighbouring pixels are combined before they are read out). Beneficially, this could potentially reduce an overall number of read-outs of similar colour pixels, and thereby saving processing resources and processing time of the at least one processor. The binning technique is well-known in the art.

It will also be appreciated in an actual implementation of the at least one neural network, different spatial pixel codes may be scaled and normalized in order to optimize a performance of the at least one neural network. As an example, the different spatial pixel codes may be scaled in a range of −1 to 1 or in a range of 0 to 1. This enables to prevent numerical instability during training of the at least one neural network.

As another example, the different spatial pixel codes may be scaled and normalised in a range of 0 to 255. As yet another example, the different spatial pixel codes may be scaled and normalised using floating-point precision (such as float16, float32, float64, or the like) or using integer precision (such as int8, int16, or the like). Other normalization or scaling techniques could also be possible, for example, that are based on average colour values when there are different number of colour pixels.

Referring to and continuing with the above example, the 2 green colour pixels having the spatial pixel codes '9' and '10' or having spatial pixel codes '9' and '12' can be combined together and be indicated in the at least one subsampling mask by using a different spatial pixel code '17'. Similarly, the 3 red colour pixels having the spatial pixel codes '13', '14', and '16' can be combined together and be indicated in the at least one subsampling mask by using a different spatial pixel code '18'. All the four red colour pixels having the spatial pixel codes '13', '14', '15', and '16' can be combined (i.e., binned/averaged) together and be indicated in the at least one subsampling mask by using a different spatial pixel code '19' for all the four red colour pixels.

Additionally, optionally, the pixels per degree (PPD) of the RAW image data could vary spatially, depending on a distortion profile of the camera. In such a case, pixel density would also vary across a field of view of the camera. As the PPD could be a function of a pixel location, the PPD could also be indicated in the at least one subsampling mask by way of pixel locations. It will be appreciated that the PPD of the RAW image data as indicated in the at least one subsampling mask would facilitate the at least one neural network to conveniently and accurately process the RAW image data, for producing the full image frame having a spatially-variable resolution. It will also be appreciated that the at least one neural network could be trained to perform the interpolation and the demosaicking on different portions of the RAW image data, according to respective PPDs of such different portions as indicated in the at least one subsampling mask. Resultantly, visual information represented in the full image frame (for example, colours, depths, brightness, and the like, of pixels in the full image frame) would be highly accurate and realistic.

Furthermore, information pertaining to the PPD could be stacked/embedded with colour filter data. For example, when an RGGB Bayer CFA is employed, the information pertaining to the PPD may be stacked with each of four colour planes of RGGB Bayer CFA data. By stacking said information with the colour filter data, resulting output would have same spatial dimensions as colour planes of the colour filter array employed. It will be appreciated that conventional Bayer CFA pattern-based image sensors typically allow for skipping entire rows and/or entire columns of a Bayer CFA pattern, i.e., some pixels may not have colour information captured in those rows and/or columns, because resulting subsampled data is still in accordance with the Bayer CFA pattern. As an example, entire rows and/or entire columns may be skipped in an alternating manner conventionally. However, such conventional image sensors do not typically support skipping rows and/or columns only partially. Pursuant to embodiments of the present disclosure, the at least one neural network could still handle such an uneven subsampling from the Bayer CFA pattern where rows and/or columns are skipped partially. This implies that the at least one neural network could potentially work with a subset of pixels from a given row and/or a given column of the Bayer CFA pattern.

Furthermore, optionally, the at least one processor is configured to:
  downscale the full image frame to generate a low-resolution image frame; and
  send the low-resolution image frame to a given client device, wherein the low-resolution image frame is to be upscaled at the given client device to generate an output image frame.

In this regard, since the full image frame is a high-resolution image frame and has a considerably large size, the full image frame is not sent as it is to the given client device and thus, is downscaled (namely, compressed or encoded) to generate the low-resolution image frame. Upon downscaling, an original (high) resolution of the full image frame is reduced to a new resolution, wherein the new resolution is a fraction of the original resolution. It will be appreciated that the aforesaid downscaling facilitates in saving storage and transmission resources, as the low-resolution image frame requires lesser storage and transmission resources as compared to the full image frame. Moreover, the low-resolution image frame is communicated to the given client device in a bandwidth-efficient manner in real time or near-real time (i.e., without any latency/delay). Upon receiving the low-resolution image frame, a processor of the given client device upscales (namely, decompresses or decodes) the low-resolution image frame to generate the output image frame. It will be appreciated that the processor of the given client device employs an upscaling algorithm (namely, a decompression algorithm) that is well-compatible with a downscaling algorithm (that was employed by the at least one processor when downscaling the full image frame into the low-resolution image frame). Downscaling and upscaling an image frame are well-known in the art.

Optionally, when downscaling the full image frame to generate the low-resolution image frame, the at least one processor is configured to employ at least one image rescaling technique. Optionally, the at least one image rescaling technique is at least one of: an invertible image rescaling technique, a reversible data hiding technique, a lossless compression technique. The aforesaid image rescaling techniques are well-known in the art. In an example, the invertible image rescaling technique enables in downscaling the full image frame to generate the low-resolution image frame in a manner that when the low-resolution image frame is upscaled to generate the output image frame, a resolution of the output image frame is nearly same as the original resolution of the full image frame. Advantageously, this facilitates in significantly improving compression efficiency in downscaling without any perceivable loss in image quality. It will be appreciated that the invertible image rescaling technique may employ a wavelet transformation, wherein an image frame is downscaled into different frequency sub-bands (namely, wavelets), thereby reducing an overall size of the image frame while preserving as much of its visual quality as possible. Such an invertible image rescaling technique is described, for example, in "*Invertible Image Rescaling*" by Mingqing Xiao et al., published in Computer Vision-European Conference on Computer Vision, Vol. 12346, pp. 126-144, November 2020, which has been incorporated herein by reference.

Optionally, the at least one processor is configured to:
  obtain information indicative of a gaze direction of a user's eye;

identify a gaze position on the photo-sensitive surface of the image sensor, based on the gaze direction of the user's eye; and select said portion of the photo-sensitive surface based on the gaze position, wherein said portion of the photo-sensitive surface surrounds a remaining portion of the photo-sensitive surface, while the remaining portion includes and surrounds the gaze position.

Optionally, in this regard, the at least one processor obtains, from the given client device, the information indicative of the gaze direction of the user's eye. Optionally, in this regard, the given client device comprises gaze-tracking means. The term "gaze direction" refers to a direction in which the user's eye is gazing. The gaze direction may be represented by a gaze vector. Furthermore, the term "gaze-tracking means" refers to specialized equipment for detecting and/or following gaze of the user's eye. The gaze-tracking means could be implemented as contact lenses with sensors, cameras monitoring a position of a pupil of the user's eye, and the like. Such gaze-tracking means are well-known in the art.

In an implementation, the gaze direction is a current gaze direction. In another implementation, the gaze direction is a predicted gaze direction. It will be appreciated that the predicted gaze direction could be predicted, for example, based on a change in the user's gaze during a predefined time period, wherein the predicted gaze direction lies along a direction of the change in the user's gaze. The change in the user's gaze could be determined, for example, in terms of gaze velocity and/or gaze acceleration of the user's eyes, using information indicative of previous gaze directions of the user's eye and/or the current gaze direction. In yet another implementation, the gaze direction is a default gaze direction, wherein the default gaze direction is straight towards a centre of a field of view of the image sensor. In such an implementation, it is considered that the gaze of the user's eye is, by default, typically directed towards a centre of his/her field of view. In such a case, a central portion of the user's field of view is resolved to a much greater degree of visual detail, as compared to a peripheral portion of the user's field of view. It is to be understood that a gaze position corresponding to the default gaze direction lies at a centre of the photo-sensitive surface.

Optionally, when identifying the gaze position on the photo-sensitive surface, the at least one processor is configured to map the gaze direction of the user's eye onto the photo-sensitive surface. The term "gaze position" refers to a position on the photo-sensitive surface onto which the gaze direction is mapped. The gaze position may, for example, be at a centre of the photo-sensitive surface, at a point in a top-left region of the photo-sensitive surface, at a point in a bottom-right region of the photo-sensitive surface, or similar.

It will be appreciated that said portion of the photo-sensitive surface and the remaining portion of the photo-sensitive surface are optionally selected dynamically, based on the gaze position. In this regard, the remaining portion of the photo-sensitive surface corresponds to a gaze area (i.e., a region of interest), whereas said portion of the photo-sensitive surface corresponds to a peripheral area surrounding the gaze area. Such a dynamic manner of selecting said portion and the remaining portion of the photo-sensitive surface emulates a way in which the user actively focuses within his/her field of view. It is to be understood that some pixels from amongst the plurality of pixels lie in said portion of the photo-sensitive surface, while remaining pixels from amongst the plurality of pixels lie in the remaining portion of the photo-sensitive surface. In an example where the image sensor comprises 25 megapixels arranged in the rectangular 2D grid (such as a 5000×5000 grid) on the photo-sensitive surface, when the gaze position is at a centre of the photo-sensitive surface, 24 megapixels (namely, 24 million pixels) may lie in said portion of the photo-sensitive surface, while remaining 1 megapixel arranged as a 1000×1000 grid may lie in the remaining portion (namely, a central portion) of the photo-sensitive surface.

Optionally, an angular extent of said portion of the photo-sensitive surface lies in a range of 12.5-50 degrees from the gaze position to 45-110 degrees from the gaze position, while an angular extent of the remaining portion of the photo-sensitive surface lies in a range of 0 degrees from the gaze position to 2-50 degrees from the gaze position.

Optionally, a subsampling density in said portion of the photo-sensitive surface decreases on going away from the gaze position. In this regard, the subsampling density reduces across said portion of the photo-sensitive surface as a distance from the gaze position increases, i.e., the subsampling density across said portion is higher near an inner periphery of said portion as compared to an outer periphery of said portion. Therefore, a number of pixels that are to be read out from said portion per unit area increase on going from the outer periphery towards the inner periphery. In other words, the subsampling density in said portion is spatially dense near the inner periphery, and is spatially sparse near the outer periphery. This is because the pixels in said portion lying near the gaze position would be perceived in a given image frame with high visual acuity by the fovea of the user's eye, as compared to the pixels in said portion lying far from the gaze position. Thus, a higher subsampling density is required near the gaze position for accurately and reliably generating RAW image data corresponding to unread pixels lying near the gaze position, using RAW image data corresponding to the (read out) pixels lying near the gaze position, to produce a high resolution in the given image frame.

It will be appreciated that when the subsampling density reduces across said portion on increase in the distance from the gaze position, a binning ratio (i.e., a number of pixels binned into a single pixel that is sampled) and a pixel-skipping ratio (i.e., a ratio of a number of skipped pixels and a number of pixels that are read out per unit area) in said portion also increases as the distance from the gaze position increases. In an example, the binning ratio near the outer periphery of said portion may be 16:1, 12:1, 9:1, 8:1, or similar, whereas the binning ratio near the inner periphery of said portion may be 6:1, 4:1, 2:1, or similar. The sampled pixel(s) and binned pixels could be arranged as a 2×1 grid, a 2×2 grid, a 3×2 grid, a 3×3 grid, a 4×3 grid, a 4×4 grid or similar. Furthermore, a ratio of a number of pixels in said portion for which RAW image data is generated (namely, hallucinated pixels) to a number of pixels in said portion that are actually read out increases as the distance from the gaze position increases. In an example implementation, the sub-sampling mask changes from one image frame to another image frame, and for each image frame, a sub-sampling density of its corresponding subsampling mask decreases across said portion on going away from the gaze position.

Furthermore, optionally, the at least one processor is configured to:
  obtain ground-truth RAW image data read out from each of the plurality of pixels of the image sensor;
  perform demosaicking on the ground-truth RAW image data to generate ground-truth image frames;

leave out pixels from the ground-truth RAW image data according to at least one subsampling mask to generate corresponding subsampled image data; and train the at least one neural network by utilising the ground-truth image frames and the corresponding subsampled image data.

In this regard, when each of the plurality of pixels of the image sensor is read out, i.e., when the plurality of pixels are sampled, the ground-truth RAW image data is obtained. Thus, the ground-truth RAW image data is highly comprehensive and information-rich as compared to the corresponding subsampled image data. The term "ground-truth RAW image data" refers to RAW image data that is obtained when each of the plurality of pixels of the image sensor is read out. Optionally, when demosaicking is performed on the ground-truth RAW image data, a set of complete colour values (for example, such as RGB colour values) for each pixel is interpolated for generating the ground-truth image frames. The term "ground-truth image frame" refers to an ideal expected image frame that is generated using on the ground-truth RAW image data. It is to be understood that the ground-truth image frames have considerably higher resolution and represent higher visual details, as compared to image frames that would be generated using the corresponding subsampled image data.

It will be appreciated that the at least one subsampling mask to be employed for training the at least one neural network need not necessarily be a same subsampling mask that is employed as the input of the at least one neural network. Moreover, the at least one subsampling mask to be employed for the training the at least one neural network could also be changed from one ground-truth image frame to another.

Optionally, when training the at least one neural network, the at least one processor is configured to employ the at least one neural network to generate the image frames using the corresponding subsampled image data and the at least one subsampling mask, and then to compare the generated image frames with the ground-truth image frames. Greater the similarity (for example, in terms of resolution) between the generated image frames with the ground-truth image frames, better is the training of the at least one neural network and higher is the probability of generating high-resolution and highly accurate image frames in future using the at least one trained neural network, and vice versa. It will be appreciated that when the at least one neural network is trained using the ground-truth image frames and the generated image frames, the at least one neural network may infer a loss function indicative of a difference between the two aforesaid image frames. This loss function may be subsequently utilised by the at least one trained neural network to generate the high-resolution and highly accurate image frames in future.

Optionally, the at least one neural network is any one of: a U-net type neural network, an autoencoder, a pure Convolutional Neural Network (CNN), a Residual Neural Network (ResNet), a Vision Transformer (ViT), a neural network having self-attention layers, a generative adversarial network (GAN). The term "U-net type neural network" refers to a neural network that is based on a typical U-net neural network. The typical U-Net neural network comprises a contracting path (namely, an encoding path) and an expansive path (namely, a decoding path). The contracting path is similar to a typical structure of a convolutional neural network, wherein repeated application of convolution takes place, followed by a rectified linear unit and a max pooling operation. The contracting path comprises a series of convolutional and pooling layers, and facilitates in progressively reducing a spatial information of an image frame while increasing a feature information of the image frame. This allows the U-net neural network to obtain high-level context information of the image frame. Subsequently, the expansive path comprises a series of up-sampling and convolutional layers, and combines the spatial information and the feature information through a series of deconvolution and concatenations with high-resolution features procured from the contracting path. In other words, the expansive path recovers the (original) spatial information of an image frame while reducing the feature information. The contracting path and the expansive path code features in the image frame at different scales. The U-Net neural network uses skip connections to preserve the spatial information from the contracting path and concatenate it with corresponding feature maps in the expansive path. This enables the U-Net neural network to recover fine details in the image frame that may have been lost during down-sampling. The U-Net neural network has also been adapted for computer vision tasks, such as image restoration and object detection. CNNs, ResNets, ViTs, neural networks having self-attention layers, and U-Net neural networks are well-known in the art.

Moreover, the "autoencoder" is a type of a neural network wherein an image frame is encoded into a lower-dimensional representation, and then the encoded image frame is decoded back to its original dimensionality. Such encoding and decoding operations are performed by said neural network using an encoder and a decoder, respectively. The autoencoder is trained in a manner that an encoded representation of an original image frame captures all its prominent features, and thus a reconstruction error between the original image frame and a decoded image frame is minimised. The autoencoder is well-known in the art.

Furthermore, the "generative adversarial network" is a type of a neural network comprising a generator neural network that is trained to generate image frames from subsampled image data generated by subsampling ground-truth image data, and a discriminator neural network that is trained to distinguish between ground-truth image frames (that are generated using the ground-truth image data) and the generated image frames. Such a process is repeated until the generator neural network of the GAN learns to generate image frames that are indistinguishable from the ground-truth image frames. Upon said learning, the trained generator neural network is employed for generating image frames, which are then downscaled and sent to a client device, whereat the downscaled image frames are again upscaled, as described earlier. Optionally, in this regard, the discriminator neural network uses the invertible image rescaling technique, as discussed earlier. It is also possible that the discriminator neural network uses the invertible image rescaling technique only during a feedforward phase, and not at a time of training phase. The GAN is well-known in the art.

It will be appreciated that a cascade of neural networks could also be employed for performing the interpolation and the demosaicking on a portion (namely, said portion and/or the remaining portion) of the RAW image data to generate given intermediate image data. As an example, two neural networks in said cascade may be employed, wherein a first neural network is a U-net type neural network that is employed for performing the interpolation and a second neural network is another U-net type neural network that is employed for the demosaicking.

It will also be appreciated that in order to preserve structural details of neighbouring pixels (for example, such as information pertaining to edges, blobs, high-frequency features, and the like) in a given image frame, and to avoid generation of undesirable artifacts in the given image frame, a gradient loss function (L) could be beneficially employed in a pixel-by-pixel manner. The gradient loss function (L) could, for example, be represented as follows:

$$L = \|\nabla Y - \nabla Y'\| + \|\nabla' Y - \nabla' Y'\|$$

wherein $\nabla$ and $\nabla'$ represent a horizontal gradient operation and a vertical gradient operation, respectively. The gradient loss function (L) measures a discrepancy between gradients of two versions of the same (given) image frame in both a horizontal direction and a vertical direction. Various gradient loss functions may be employed apart from that mentioned above. As an example, a gradient loss function may comprise masks that selectively exclude or include certain pixels, for example, such as only interpolated pixels would be considered in a calculation of the gradient loss function. By using masks to control inclusion or exclusion of the certain pixels, the gradient loss function can be employed to focus on specific regions or features of interest in the given image frame. This flexibility allows for more fine-grained control over preservation of the structural details in the given image frame. Additionally, a directional weighted interpolation technique may be used for performing an interpolation on image data of the given image frame.

The present disclosure also relates to the method as described above. Various embodiments and variants disclosed above, with respect to the aforementioned imaging system, apply mutatis mutandis to the method.

Optionally, the method further comprises:
performing demosaicking on a remaining portion of the RAW image data that is not subsampled during the read out, for generating a second intermediate image data; and
processing the first intermediate image data and the second intermediate image data for generating a full image frame.

Alternatively or additionally, optionally, for each $N^{th}$ image frame, a remaining portion of the RAW image data is also subsampled during read out from a remaining portion of the photo-sensitive surface, wherein the method further comprises:
performing interpolation and demosaicking on the remaining portion of the RAW image data using the at least one neural network, for generating a second intermediate image data, wherein the input of the at least one neural network further comprises the remaining portion of the RAW image data; and
processing the first intermediate image data and the second intermediate image data for generating a full image frame.

Optionally, in the method, a subsampling density of the remaining portion of the RAW image data is higher than a subsampling density of said portion of the RAW image data.

Optionally, the method further comprises performing the interpolation and the demosaicking on the remaining portion of the RAW image data using at least one other neural network.

Optionally, the method further comprises:
downscaling the full image frame to generate a low-resolution image frame; and
sending the low-resolution image frame to a given client device, wherein the low-resolution image frame is upscaled at the given client device for generating an output image frame.

Optionally, the method further comprises:
obtaining ground-truth RAW image data read out from each of the plurality of pixels of the image sensor;
performing demosaicking on the ground-truth RAW image data for generating ground-truth image frames;
leaving out pixels from the ground-truth RAW image data according to at least one subsampling mask for generating corresponding subsampled image data; and
training the at least one neural network by utilising the ground-truth image frames and the corresponding subsampled image data.

Optionally, in the method, the at least one neural network is any one of: a U-net type neural network, an autoencoder, a pure Convolutional Neural Network (CNN), a Residual Neural Network (ResNet), a Vision Transformer (ViT), a neural network having self-attention layers, a generative adversarial network (GAN).

Optionally, the method further comprises:
obtaining information indicative of a gaze direction of a user's eye;
identifying a gaze position on the photo-sensitive surface of the image sensor, based on the gaze direction of the user's eye; and
selecting said portion of the photo-sensitive surface based on the gaze position, wherein said portion of the photo-sensitive surface surrounds a remaining portion of the photo-sensitive surface, while the remaining portion includes and surrounds the gaze position.

Optionally, in the method, a subsampling density in said portion of the photo-sensitive surface decreases on going away from the gaze position.

Optionally, the method further comprises:
changing the at least one subsampling mask from one image frame to another image frame; and
controlling the image sensor to read out the RAW image data according to the at least one subsampling mask.

Optionally, in the method, the at least one subsampling mask is selected randomly.

Optionally, in the method, the at least one subsampling mask further indicates a colour filter array (CFA) pattern of the image sensor.

Optionally, in the method, the at least one subsampling mask further indicates at least one of:
colours of pixels that have been read out,
colours of pixels that have not been read out,
different colours using different spatial pixel codes,
repetitions of a same colour in a smallest repeating M×N array in the image sensor using different spatial pixel codes,
different combinations of neighbouring pixels having a same colour in the smallest repeating M×N array using different spatial pixel codes,
pixels per degree of the RAW image data.

DETAILED DESCRIPTION OF THE DRAWINGS

Referring to FIG. 1, illustrated is a block diagram of an architecture of an imaging system 100 for interpolating and demosaicking subsampled pixels using neural networks, in accordance with an embodiment of the present disclosure. The imaging system 100 comprises an image sensor 102 and at least one processor (depicted as a processor 104). The image sensor 102 comprises a plurality of pixels (not shown) arranged on a photo-sensitive surface thereof. The processor 104 is coupled to the image sensor 102.

It may be understood by a person skilled in the art that FIG. 1 includes a simplified architecture of the imaging system 100, for sake of clarity, which should not unduly limit the scope of the claims herein. It is to be understood that the specific implementation of the imaging system 100 is provided as an example and is not to be construed as limiting it to specific numbers or types of image sensors and/or processors. The person skilled in the art will recognize many variations, alternatives, and modifications of embodiments of the present disclosure.

Figure 2A:
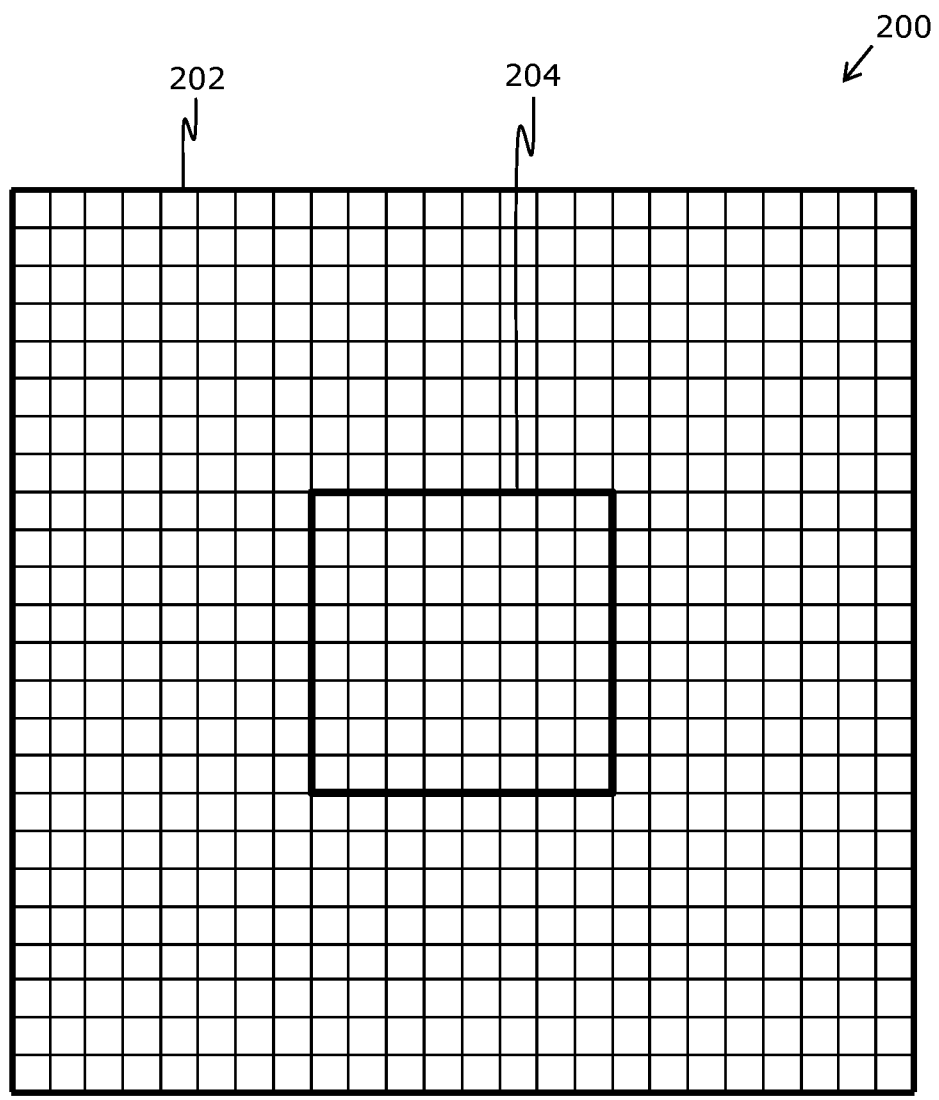
Figure 2B:
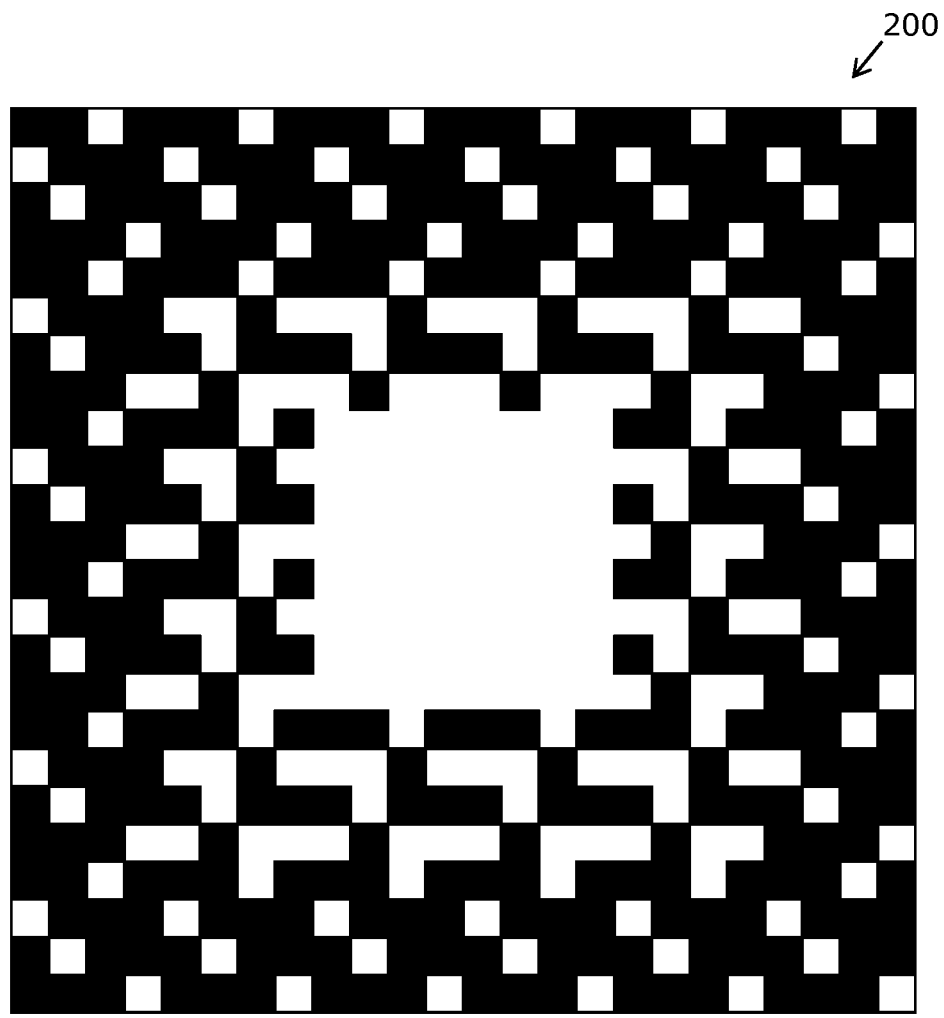
FIG. 2B illustrates how pixels arranged on the photo-sensitive surface are read out, in accordance with an embodiment of the present disclosure.

Referring to FIG. 2A, illustrated are different portions on a photo-sensitive surface 200 of an image sensor (not shown), while FIG. 2B illustrates how pixels arranged on the photo-sensitive surface 200 are read out, in accordance with an embodiment of the present disclosure. In FIG. 2A, the photo-sensitive surface 200 is shown to comprise 576 pixels arranged in a 24×24 grid, for the sake of simplicity and clarity only. It will be appreciated that a photo-sensitive surface of a typical image sensor has millions of pixels. As an example, the photo-sensitive surface 200 has a given portion 202 and a remaining portion 204 that are optionally determined based on a gaze position (for example, at a centre of the photo-sensitive surface 200). The given portion 202 surrounds the remaining portion 204, and is shown to include 512 pixels. The remaining portion 204 includes and surrounds the gaze position, and is shown as an 8×8 grid of 64 pixels.

In FIG. 2B, white pixels illustrate pixels that are read out from the photo-sensitive surface 200, whereas blackened pixels illustrate pixels that are not read out from the photo-sensitive surface 200. As shown, only some pixels of the given portion 202 are read out, while other pixels of the given portion 202 are skipped (i.e., not read out). In other words, RAW image data corresponding to pixels in the given portion 202 is subsampled during the read out. On the other hand, each and every pixel of the remaining portion 204 is read out. In other words, RAW image data corresponding to pixels in the remaining portion 204 is fully sampled during the read out. Pixels that are to be read out and pixels that are not to be read out from the photo-sensitive surface 200 are indicated by using at least one subsampling mask. It will be appreciated that a subsampling density in the given portion 202 optionally decreases on going away from the gaze position. For example, a subsampling density in the given portion 202 decreases from 50 percent to 25 percent on going away from the gaze position. Furthermore, a sampling density in the remaining portion 204 is 100 percent.

FIGS. 2A and 2B are merely examples, which should not unduly limit the scope of the claims herein. A person skilled in the art will recognize many variations, alternatives, and modifications of embodiments of the present disclosure. In an example, the photo-sensitive surface 200 may comprise 25 megapixels arranged in a 5000×5000 grid. In another example, when the gaze position is at a point in a top-left region of the photo-sensitive surface 200, or at a point in a bottom-right region of the photo-sensitive surface 200, or similar, a location of the remaining portion 204 may change accordingly. Moreover, for each $N^{th}$ image frame, the RAW image data corresponding to pixels in the remaining portion 204 may also be subsampled during the read out.

Figure 3:
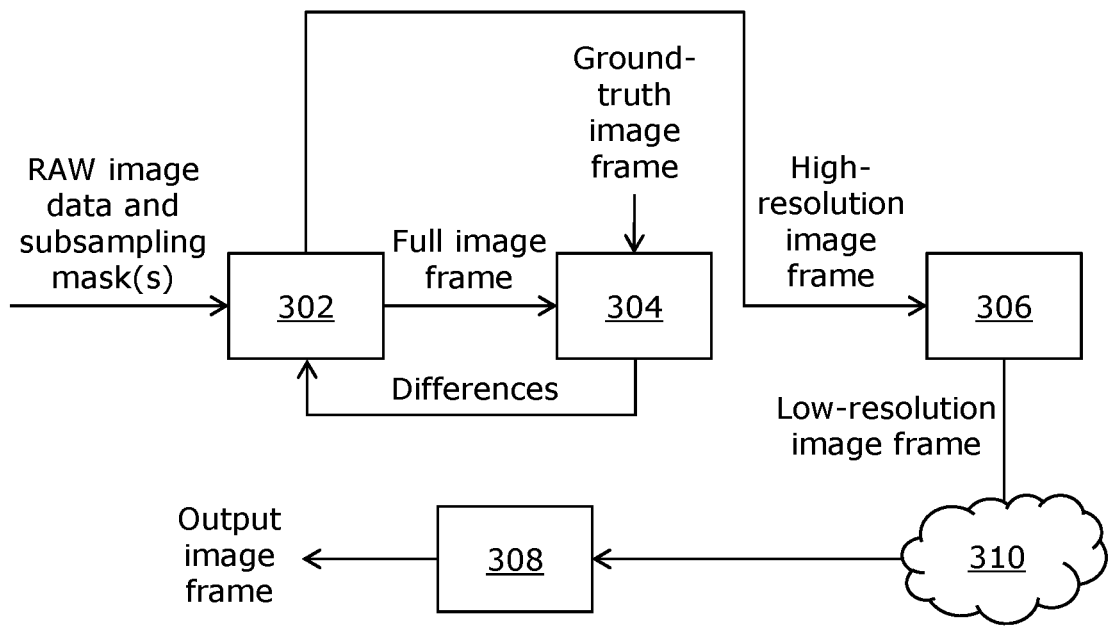
FIG. 3 illustrates an exemplary processing pipeline for generating an image frame, in accordance with an embodiment of the present disclosure.

Referring to FIG. 3, illustrated is an exemplary processing pipeline for generating an image frame, in accordance with an embodiment of the present disclosure. The processing pipeline is implemented by at least one processor (not shown) that is coupled to an image sensor (not shown), wherein the image sensor comprises a plurality of pixels arranged on a photo-sensitive surface thereof. Firstly, the at least one processor performs interpolation and demosaicking on RAW image data using a generator 302 of at least one neural network, to generate a full image frame, wherein an input of the generator 302 comprises the RAW image data and at least one subsampling mask, and an output of the generator 302 comprises the full image frame. Then, the at least one processor compares the full image frame with a ground-truth image frame using a discriminator 304 of the at least one neural network, wherein an input of the discriminator 304 comprises the full image frame and the ground-truth image frame, and an output of the discriminator 304 comprises information pertaining to differences between the two aforesaid image frames. The ground-truth image frame is generated (by the at least one processor) using ground-truth image data read out from each of the plurality of pixels of the image sensor. The aforesaid information is then fed to the generator 302 (for example, as a feedback) for training the generator 302.

Upon training, a high-resolution image frame is generated by the generator 302; the high-resolution image frame being indistinguishable from the ground-truth image frame. Then, the at least one processor downscales the high-resolution image frame using an encoder 306 to generate a low-resolution image frame. Thereafter, the at least one processor sends the low-resolution image frame to a client device 308 via a communication network 310. Upon receiving the low-resolution image frame, a processor (not shown) of the client device 308 upscales the low-resolution image frame to generate an output image frame.

FIG. 3 is merely an example, which should not unduly limit the scope of the claims herein. The person skilled in the art will recognize many variations, alternatives, and modifications of embodiments of the present disclosure.

Figure 4:
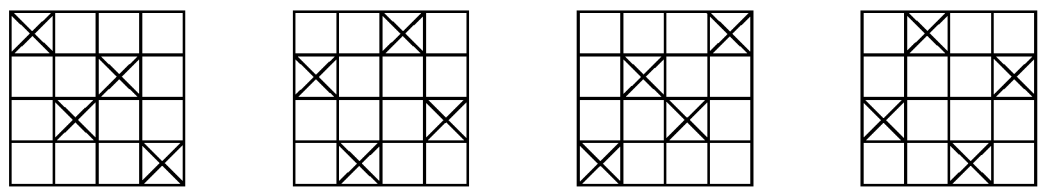
FIG. 4 illustrates an exemplary manner in which a subsampling mask changes across eight image frames, in accordance with an embodiment of the present disclosure.
Figure 4:
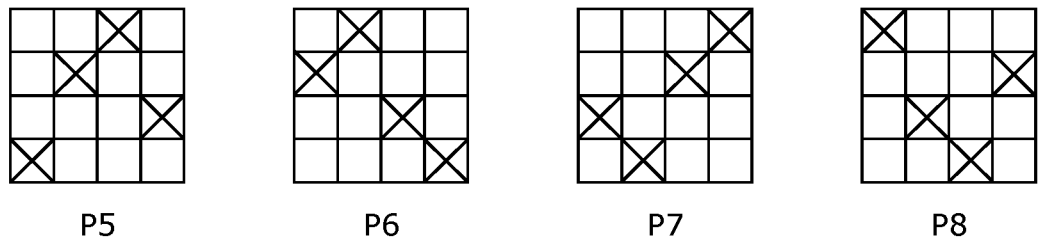

Referring to FIG. 4, illustrated is an exemplary manner in which a subsampling mask changes across eight image frames, in accordance with an embodiment of the present disclosure. For sake of simplicity, only a portion of the subsampling mask corresponding to a 4×4 grid of pixels arranged on a portion of a photo-sensitive surface of an image sensor is depicted in FIG. 4. Various forms of the portion of the subsampling mask corresponding to the eight image frames are represented as P1, P2, P3, P4, P5, P6, P7, and P8. A subsampling density of the portion of the subsampling mask is shown to be 25 percent (i.e., only pixels that are crossed out as 'X' are read out while other pixels are not read out).

Referring to FIGS. 5A, 5B, 5C, and 5D, illustrated is an exemplary way of performing interpolation on RAW image data corresponding to some pixels in a portion 500 of a photo-sensitive surface, in accordance with an embodiment of the present disclosure. The portion 500 of the photo-sensitive surface is shown to comprise 64 pixels arranged in an 8×8 grid, for the sake of simplicity and clarity. In FIGS. 5A-5D, said interpolation is performed to generate RAW image data corresponding to remaining pixels in the portion 500 of the photo-sensitive surface.

Figure 5A:
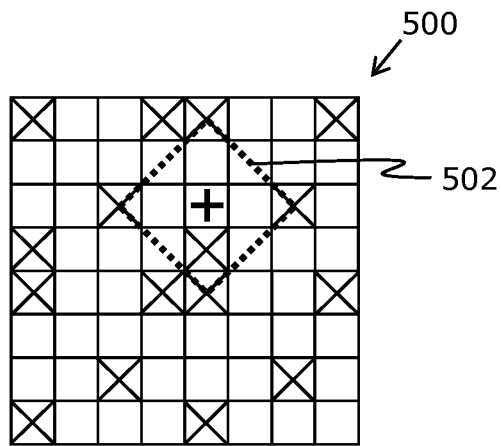
FIGS. 5A, 5B, 5C, and 5D illustrate an exemplary way of performing interpolation on RAW image data corresponding to some pixels in a portion of a photo-sensitive surface, in accordance with an embodiment of the present disclosure.
Figure 5B:
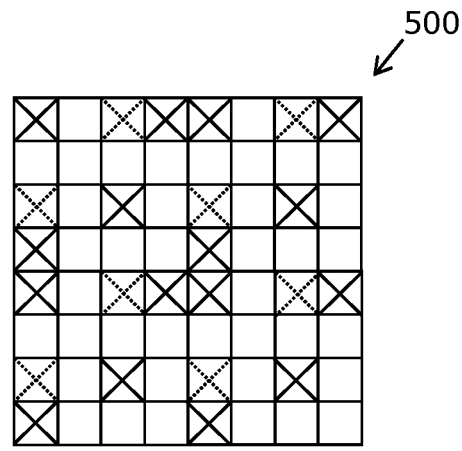
Figure 5C:
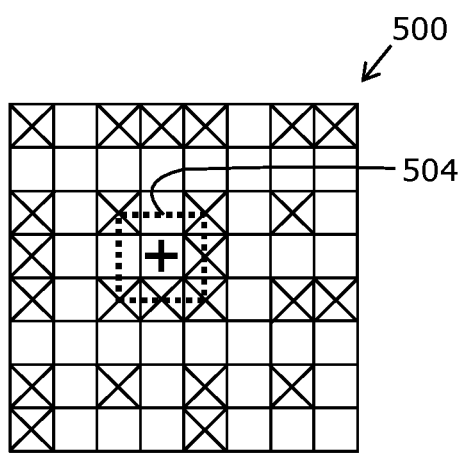
Figure 5D:
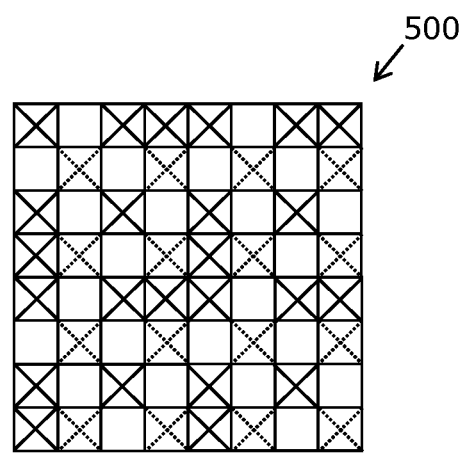

In FIG. 5A, pixels that are read out from the portion 500 are shown as 16 pixels that are crossed out as solid 'X's. A diamond pattern 502 is employed for generating RAW image data, wherein RAW image data corresponding to pixels at corners of the diamond pattern 502 is used to generate RAW image data corresponding to a pixel (labelled as '+') lying in a centre of the diamond pattern 502. The diamond pattern 502 is moved across the portion 500, to generate RAW image data corresponding to at least one pixel in the portion 500. In FIG. 5B, there are shown 8 pixels (crossed out as dotted 'X's) for which RAW image data is generated using the diamond pattern 502. Next, in FIG. 5C, pixels for which RAW image data is available are shown as 24 pixels that are crossed out as solid 'X's. A square pattern 504 is employed for generating RAW image data, wherein RAW image data corresponding to pixels at corners of the square pattern 504 is used to generate RAW image data corresponding to a pixel (labelled as '+') lying in a centre of the square pattern 504. The square pattern 504 is moved across the portion 500, to generate RAW image data corresponding to at least one pixel in the portion 500. In FIG. 5D, there are shown 16 pixels (crossed out as dotted 'X's) for which RAW image data is generated using the square pattern 504. It will be appreciated that apart from using the diamond pattern 502 and the square pattern 504 as described hereinabove, when a remaining pixel (of the portion 500) lies diagonally in between two pixels that are read out from the portion 500, RAW image data corresponding to said remaining pixel could be generated by averaging RAW image data corresponding to the aforesaid two pixels, or by performing interpolation on the RAW image data corresponding to the aforesaid two pixels.

FIG. 4 and FIGS. 5A-5D are merely examples, which should not unduly limit the scope of the claims herein. The person skilled in the art will recognize many variations, alternatives, and modifications of embodiments of the present disclosure.

Figures 6A, 6B, 7A, 7B, 8:
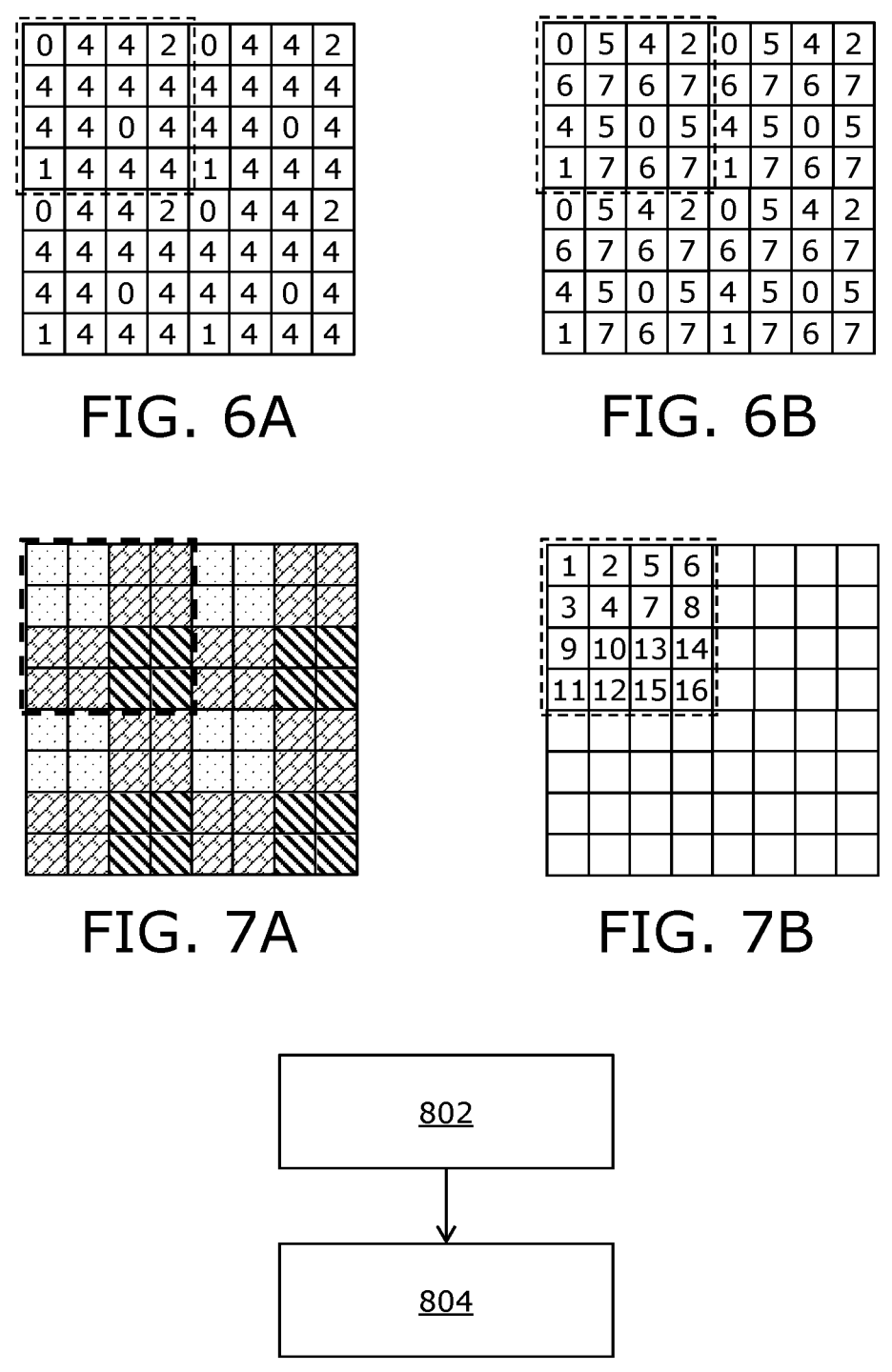

Referring to FIGS. 6A and 6B, illustrated are exemplary ways in which a subsampling mask indicates colours of pixels using spatial pixel codes, in accordance with an embodiment of the present disclosure. With reference to FIGS. 6A and 6B, the subsampling mask is shown as an 8×8 subsampling masking pattern, for the sake of simplicity and clarity. Moreover, a portion (depicted using a dashed box) of the subsampling mask corresponds to a 4×4 grid of pixels arranged on a portion of a photo-sensitive surface of an image sensor, and is optionally repeated in the subsampling mask, for the sake of simplicity. With reference to FIG. 6A, the portion of the subsampling mask indicates 4 pixels that have been read out from amongst 16 pixels, and also indicates colours of such 4 pixels, using different spatial pixel codes, for example, such as '0' indicating a green colour pixel, '1' indicating a blue colour pixel, and '2' indicating a red colour pixel. In addition to this, said portion of the subsampling mask also indicates 12 pixels amongst the 16 pixels that have not been read out (namely, the pixels that are skipped during the read out), using a single spatial pixel code, for example, such as '4'. Such a single spatial pixel code only indicates that the 12 pixels have not been read out and thus, does not indicate colours of such 12 pixels.

With reference to FIG. 6B, the portion of the subsampling mask indicates 4 pixels amongst 16 pixels that have been read out and also indicates colours of such 4 pixels, using different spatial pixel codes, for example, such as '0' indicating a green colour pixel, '1' indicating a blue colour pixel, '2' indicating a red colour pixel, and '3' indicating another green colour pixel. In addition to this, said portion of the subsampling mask also indicates 12 pixels amongst the 16 pixels that have not been read out and also indicates colours of such 12 pixels, using different spatial pixel codes, for example, such as '4' indicating an unread green colour pixel, '5' indicating an unread red colour pixel, '6' indicating an unread blue colour pixel, and '7' indicating another unread green colour pixel.

FIGS. 6A and 6B are merely examples, which should not unduly limit the scope of the claims herein. The person skilled in the art will recognize many variations, alternatives, and modifications of embodiments of the present disclosure. As an example, with reference to FIG. 6A, the single spatial pixel code could also be different than that mentioned earlier. For example, the single spatial pixel code may be 3, 5, −1, −2, −3, or similar. As another example, with reference to FIG. 6B, the colours of the 4 pixels could also be indicated by using spatial pixel codes other than those mentioned earlier. For example, spatial pixel codes of the 4 unread pixels may be '−1', '−2', '−3', and '−4' for indicating the unread green colour pixel, the unread blue colour pixel, the unread red colour pixel, and the another unread green colour pixel, respectively. Similarly, the colours of the 12 pixels could also be indicated by using spatial pixel codes other than those mentioned earlier.

Referring to FIGS. 7A and 7B, FIG. 7A illustrates an exemplary colour filter array (CFA) pattern of an image sensor indicated by a subsampling mask, while FIG. 7B illustrates an exemplary way in which a portion of a subsampling mask indicates colours in a smallest repeating 4×4 array in the image sensor using different spatial pixel codes, in accordance with an embodiment of the present disclosure. With reference to FIG. 7A, a portion (depicted using a dashed box) of the CFA pattern corresponds to a 4×4 array of pixels arranged on a portion of a photo-sensitive surface of the image sensor, and is repeated in the CFA pattern. The CFA pattern is shown as a quad Bayer pattern, wherein the quad Bayer pattern has, one 2×2 array of blue colour pixels (depicted as a dotted pattern), two 2×2 arrays of green colour pixels (depicted as a diagonal brick pattern), and one 2×2 array of red colour pixels (depicted as a diagonal line pattern).

With reference to FIG. 7B, the portion of the subsampling mask indicates 4 blue colour pixels using 4 different spatial pixel codes '1', '2', '3', and '4', respectively. Similarly, the portion indicates 8 green colour pixels using 8 different spatial pixel codes '5', '6', '7', '8', '9', '10', '11', and '12', respectively. The portion indicates 4 red colour pixels using 4 different spatial pixel codes as '13', '14', '15' and '16', respectively.

FIGS. 7A and 7B are merely examples, which should not unduly limit the scope of the claims herein. The person skilled in the art will recognize many variations, alternatives, and modifications of embodiments of the present disclosure. As an example, with reference to FIG. 7B, when two green colour pixels having spatial pixel codes '9' and '10' or having spatial pixel codes '9' and '12' are to be read out together, this can be indicated in the subsampling mask by using a single spatial pixel code '17'. Similarly, when three red colour pixels having spatial pixel codes '13', '14', and '16' are to be read out together, this can be indicated in the subsampling mask by using a single spatial pixel code '18'. When all the four red colour pixels having spatial pixel codes '13', '14', '15', and '16' are to be read out together, this can be indicated in the subsampling mask by using a single spatial pixel code '19'.

Referring to FIG. 8, illustrated are steps of a method for interpolating and demosaicking subsampled pixels using neural networks, in accordance with an embodiment of the present disclosure. At step 802, RAW image data read out by an image sensor is obtained, wherein the image sensor comprises a plurality of pixels arranged on a photo-sensitive surface thereof, and wherein at least a portion of the RAW image data is subsampled during the read out from at least a portion of the photo-sensitive surface. At step 804, interpolation and demosaicking are performed on at least said portion of the RAW image data using at least one neural network, for generating a first intermediate image data, wherein an input of the at least one neural network comprises said portion of the RAW image data and at least one subsampling mask, wherein the at least one subsampling mask indicates pixels that have not been read out.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging system comprising:
   an image sensor comprising a plurality of pixels arranged on a photo-sensitive surface thereof, the image sensor being employed to read out RAW image data, wherein at least a portion of the RAW image data is subsampled during read out from at least a portion of the photo-sensitive surface; and
   at least one processor configured to:
     obtain the RAW image data read out by the image sensor; and
     perform interpolation and demosaicking on at least said portion of the RAW image data using at least one neural network, to generate a first intermediate image data, wherein an input of the at least one neural network comprises said portion of the RAW image data and at least one subsampling mask, wherein the at least one subsampling mask indicates pixels that have not been read out.

2. The imaging system of claim 1, wherein the at least one processor is configured to:
   perform demosaicking on a remaining portion of the RAW image data that is not subsampled during the read out, to generate a second intermediate image data; and
   process the first intermediate image data and the second intermediate image data to generate a full image frame.

3. The imaging system of claim 1, wherein for each N$^{th}$ image frame, a remaining portion of the RAW image data is also subsampled during read out from a remaining portion of the photo-sensitive surface, wherein the at least one processor is configured to:
   perform interpolation and demosaicking on the remaining portion of the RAW image data using the at least one neural network, to generate a second intermediate image data, wherein the input of the at least one neural network further comprises the remaining portion of the RAW image data; and
   process the first intermediate image data and the second intermediate image data to generate a full image frame.

4. The imaging system of claim 3, wherein a subsampling density of the remaining portion of the RAW image data is higher than a subsampling density of said portion of the RAW image data.

5. The imaging system of claim 3, wherein the at least one processor is configured to perform the interpolation and the demosaicking on the remaining portion of the RAW image data using at least one other neural network.

6. The imaging system of claim 3, wherein the at least one processor is configured to:
   downscale the full image frame to generate a low-resolution image frame; and
   send the low-resolution image frame to a given client device, wherein the low-resolution image frame is to be upscaled at the given client device to generate an output image frame.

7. The imaging system of claim 1, wherein the at least one processor is configured to:
   obtain ground-truth RAW image data read out from each of the plurality of pixels of the image sensor;
   perform demosaicking on the ground-truth RAW image data to generate ground-truth image frames;
   leave out pixels from the ground-truth RAW image data according to at least one subsampling mask to generate corresponding subsampled image data; and
   train the at least one neural network by utilising the ground-truth image frames and the corresponding subsampled image data.

8. The imaging system of claim 1, wherein the at least one processor is configured to:
   obtain information indicative of a gaze direction of a user's eye;
   identify a gaze position on the photo-sensitive surface of the image sensor, based on the gaze direction of the user's eye; and
   select said portion of the photo-sensitive surface based on the gaze position, wherein said portion of the photo-sensitive surface surrounds a remaining portion of the photo-sensitive surface, while the remaining portion includes and surrounds the gaze position, wherein optionally, a subsampling density in said portion of the photo-sensitive surface decreases on going away from the gaze position.

9. The imaging system of claim 1, wherein the at least one processor is configured to:
   change the at least one subsampling mask from one image frame to another image frame; and
   control the image sensor to read out the RAW image data according to the at least one subsampling mask.

10. The imaging system of claim 1, wherein the at least one subsampling mask is selected randomly.

11. The imaging system of claim 1, wherein the at least one subsampling mask further indicates a colour filter array pattern of the image sensor.

12. The imaging system of claim 1, wherein the at least one subsampling mask further indicates at least one of:
    colours of pixels that have been read out,
    colours of pixels that have not been read out,
    different colours using different spatial pixel codes,
    repetitions of a same colour in a smallest repeating M×N array in the image sensor using different spatial pixel codes,
    different combinations of neighbouring pixels having a same colour in the smallest repeating M×N array using different spatial pixel codes,
    pixels per degree of the RAW image data.

13. A method comprising:
    obtaining RAW image data read out by an image sensor, wherein the image sensor comprises a plurality of pixels arranged on a photo-sensitive surface thereof, and wherein at least a portion of the RAW image data is subsampled during the read out from at least a portion of the photo-sensitive surface; and
    performing interpolation and demosaicking on at least said portion of the RAW image data using at least one neural network, for generating a first intermediate image data, wherein an input of the at least one neural network comprises said portion of the RAW image data and at least one subsampling mask, wherein the at least one subsampling mask indicates pixels that have not been read out.

14. The method of claim 13, further comprising:
performing demosaicking on a remaining portion of the RAW image data that is not subsampled during the read out, for generating a second intermediate image data; and
processing the first intermediate image data and the second intermediate image data for generating a full image frame.

15. The method of claim 13, wherein for each $N^{th}$ image frame, a remaining portion of the RAW image data is also subsampled during read out from a remaining portion of the photo-sensitive surface, wherein the method further comprises:
performing interpolation and demosaicking on the remaining portion of the RAW image data using the at least one neural network, for generating a second intermediate image data, wherein the input of the at least one neural network further comprises the remaining portion of the RAW image data; and
processing the first intermediate image data and the second intermediate image data for generating a full image frame,
wherein optionally, a subsampling density of the remaining portion of the RAW image data is higher than a subsampling density of said portion of the RAW image data.

16. The method of claim 14, further comprising:
downscaling the full image frame to generate a low-resolution image frame; and
sending the low-resolution image frame to a given client device, wherein the low-resolution image frame is upscaled at the given client device for generating an output image frame.

* * * * *